US006848583B2

(12) United States Patent
Largent et al.

(10) Patent No.: US 6,848,583 B2
(45) Date of Patent: Feb. 1, 2005

(54) DRILLING FLUID TREATMENT

(75) Inventors: David W. Largent, Cleveland, TX (US); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 133 days.

(21) Appl. No.: 10/306,891

(22) Filed: Nov. 27, 2002

(65) Prior Publication Data

US 2004/0099582 A1 May 27, 2004

(51) Int. Cl.[7] .............................................. B07B 13/05
(52) U.S. Cl. ...................... 209/673; 209/234; 209/672
(58) Field of Search ................................. 209/234, 311, 209/315, 423, 424, 667, 672, 673

(56) References Cited

U.S. PATENT DOCUMENTS

| | | |
|---|---|---|
| 2,075,747 A | 3/1937 | Nolte |
| 2,923,410 A | 2/1960 | Tschmelitsch |
| 3,963,605 A | 6/1976 | Seabourn |
| 4,102,502 A | 7/1978 | Vaplon et al. |
| 4,116,288 A | 9/1978 | Love |
| 4,430,210 A | 2/1984 | Tuuha |
| 4,795,036 A * | 1/1989 | Williams ..................... 209/667 |
| 4,809,791 A | 3/1989 | Hayatdavoudi |
| 5,921,399 A | 7/1999 | Bakula et al. |
| 6,024,228 A | 2/2000 | Williams |
| 6,116,295 A | 9/2000 | Williams |
| 6,234,322 B1 * | 5/2001 | Paladin ........................ 209/667 |
| 6,250,478 B1 * | 6/2001 | Davis ........................... 209/672 |

FOREIGN PATENT DOCUMENTS

| | | | |
|---|---|---|---|
| EP | 1188489 A2 | 7/2001 | ............. B07B/1/46 |
| WO | WO 98/16295 | 10/1996 | ............ B01D/35/28 |

* cited by examiner

*Primary Examiner*—Donald P. Walsh
*Assistant Examiner*—Joseph Rodriguez
(74) *Attorney, Agent, or Firm*—Guy McClung

(57) ABSTRACT

A shale shaker having a basket for holding screen assembly apparatus, screen assembly apparatus for treating fluid introduced to the shale shaker, a roller bed assembly secured above and/or to the basket above the screen assembly apparatus, the roller bed assembly having a plurality of spaced-apart rotatable rollers, the fluid initially introduced to the shale shaker onto the roller bed assembly. The shale shaker wherein the fluid is drilling fluid with large undesirable solids therein, said large undesirable solids separable from the drilling fluid by the roller bed assembly.

22 Claims, 10 Drawing Sheets

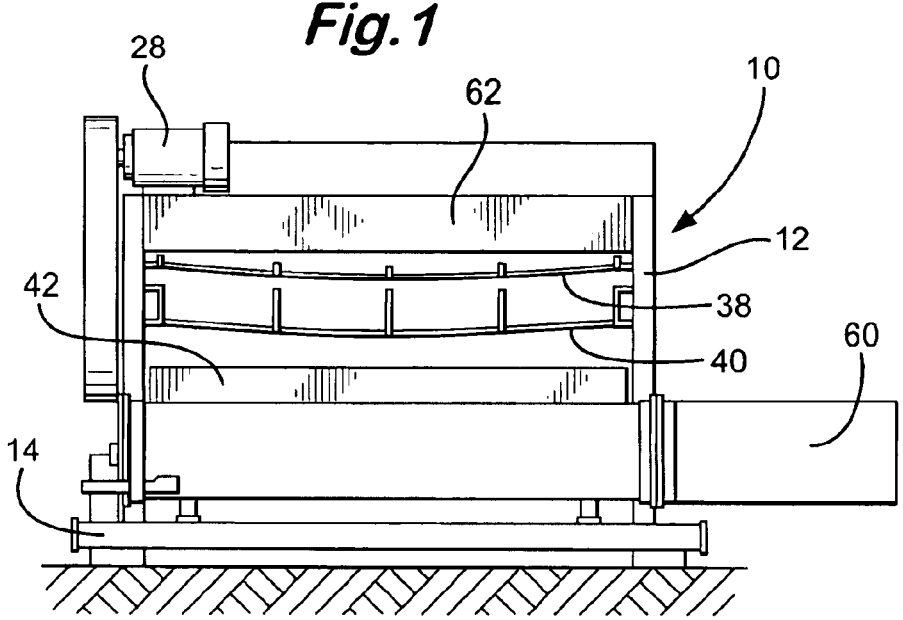
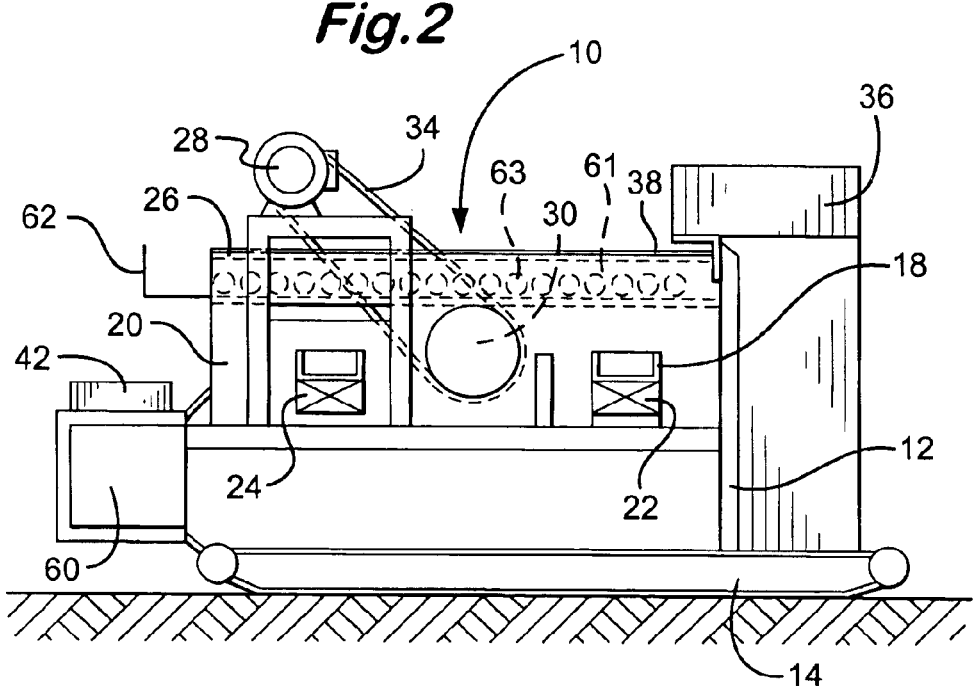

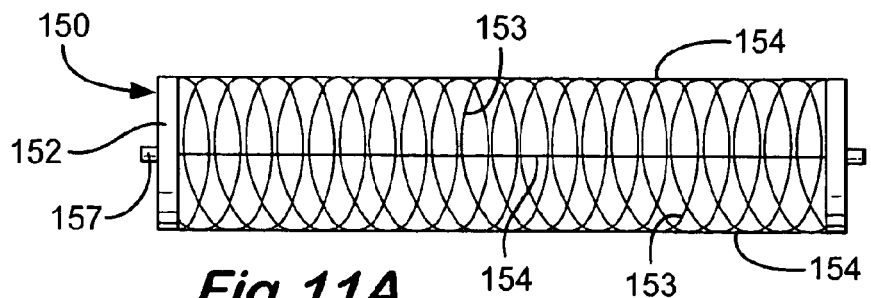
*Fig. 11A*
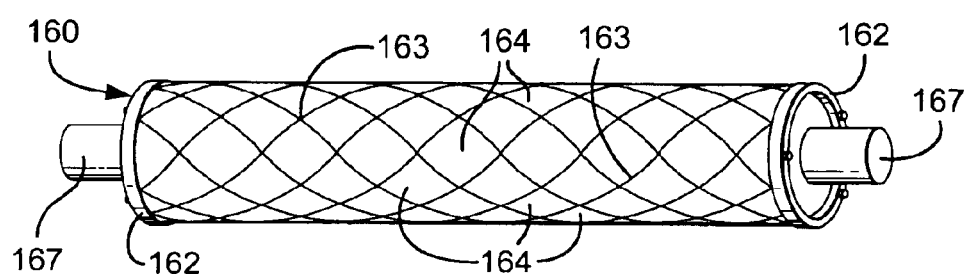
*Fig. 11B*
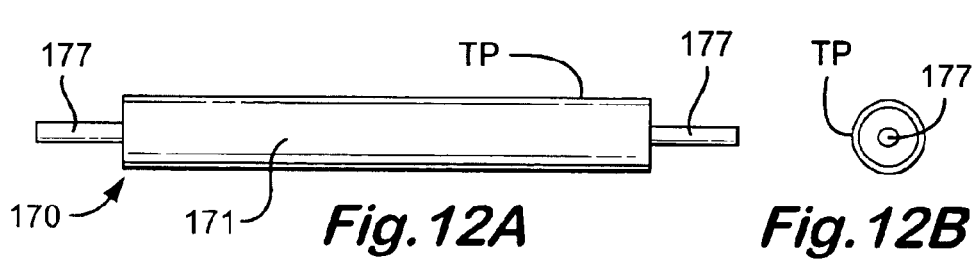
*Fig. 12A*   *Fig. 12B*
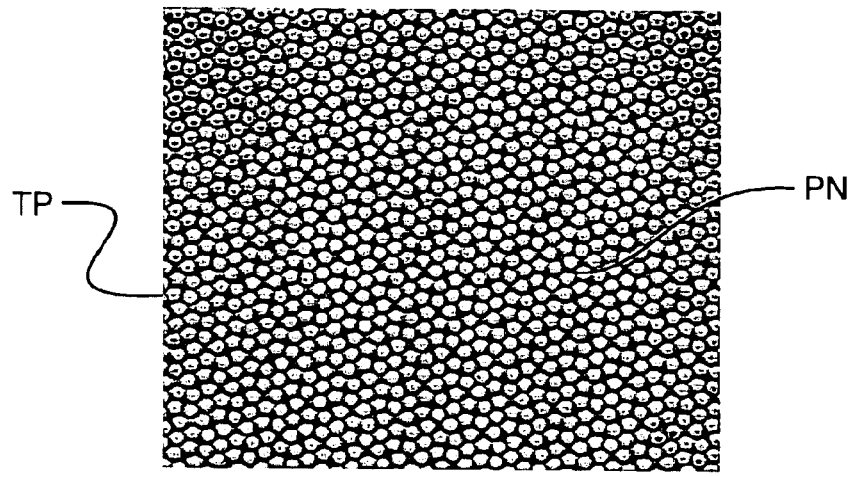
*Fig. 13*

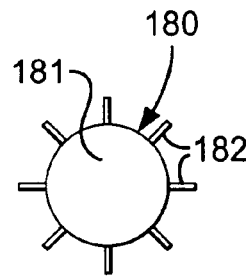
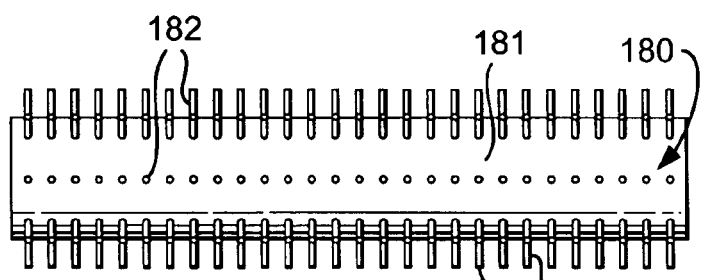
*Fig. 14A*    *Fig. 14B*
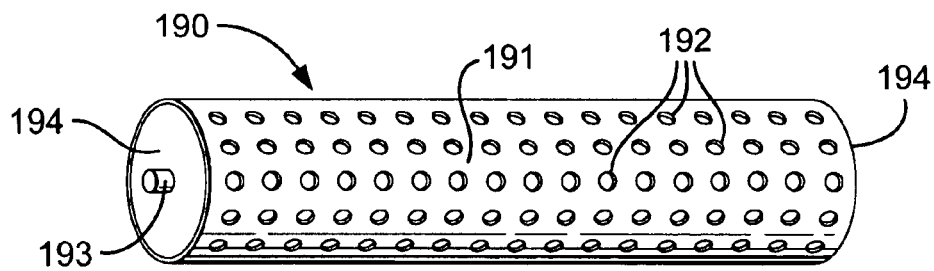
*Fig. 15*
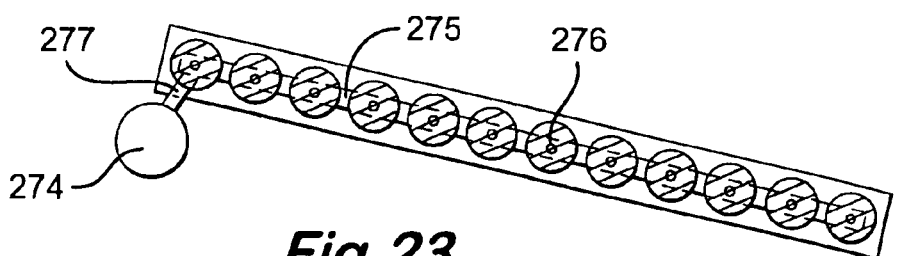
*Fig. 23*

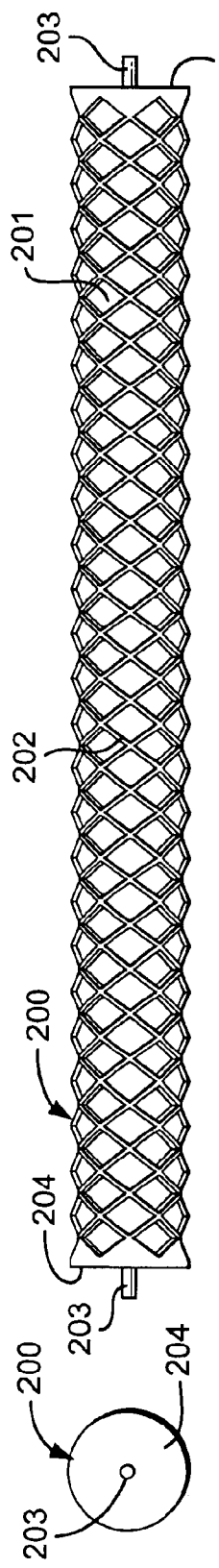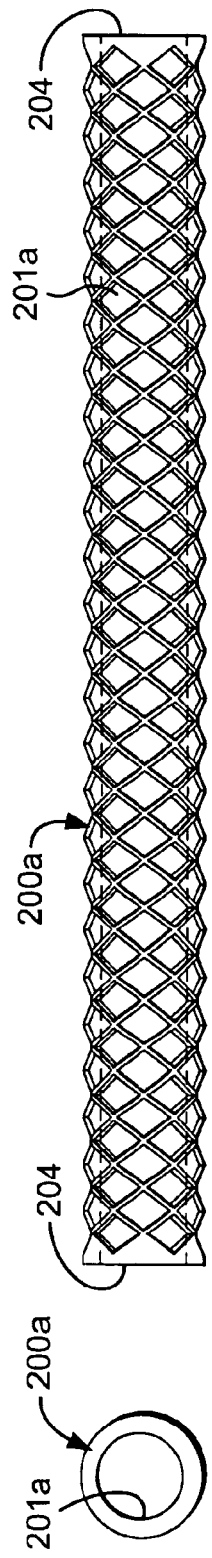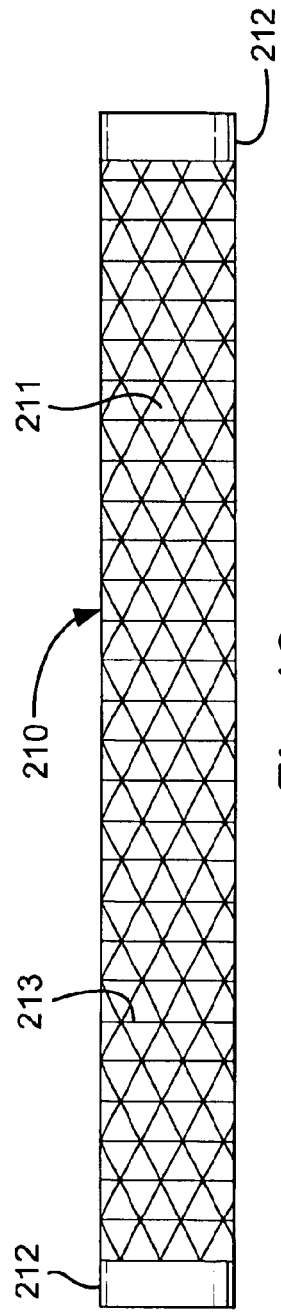

DRILLING FLUID TREATMENT

BACKGROUND OF THE INVENTION

1. Field of the Invention

This invention is related to the treatment of used drilling fluid to separate its various components and produce re-usable fluid; and, in certain particular aspects, to methods and equipment for removing hydrated clays or "gumbo" from drilling fluid.

2. Description of Related Art

In drilling wells it is common to circulate drilling fluid or "mud" down a wellbore in progress to remove drilled cuttings or "drilled solids" from the wellbore. At the surface the mud is separated from the drilled solids so that the mud can be re-used by re-circulating the cleaned mud back down into the wellbore. The prior art discloses a variety of machines and apparatuses used to clean drilling mud, including, e.g., centrifuges, shale shakers, and gumbo separators.

Gummy hydrated clay or "gumbo" in a formation through which a wellbore is being drilled can adhere to equipment, agglomerate in large solid masses, and can clog and blind screens and other separation equipment. Some prior art efforts to deal with gumbo have included using chemical additives to change the properties of drilling mud, but this adds cost to the drilling expense. In other prior art systems the vibrational amplitude of a shale shaker is increased and various types of water sprays are used, but often the gumbo simply forms a new steady state gumbo mass at the new operating conditions. Specialized coatings have been applied to screens, e.g. as described in U.S. Pat. No. 3,963,605, but these coatings add cost to the screening equipment, and can be worn off the screens. U.S. Pat. No. 5,921,399 discloses apparatus used in conjunction with, and upstream of, existing mud cleaning equipment that removes gumbo from drilling mud before drilling cuttings are removed from the mud.

SUMMARY OF THE PRESENT INVENTION

The present invention, in at least certain aspects, provides a shale shaker with an upper roller assembly which initially receives drilling fluid to be treated by the shale shaker. The roller assembly has a bed of a plurality of spaced-apart rollers which prevent gumbo masses from flowing down to one or more screen assemblies in the shale shaker. These gumbo masses move along the top of the roller bed to an exit end so that the shale shaker screens do not have to deal with them. Fluid to be treated flows between the rollers down to the screening apparatus(es). In certain aspects, with respect to shakers and separators that have structure, equipment, devices, etc. at an upper level or above a basket, a roller bed assembly according to the present invention is positioned sufficiently below any such structure, etc., that gumbo masses can move on, along, and then off of the roller bed assembly without being impeded by such structure, etc.

In certain aspects the rollers are solid and extend across the width of a shaker basket. In other aspects the rollers are porous and/or have one or more openings, slots, holes or slits through which liquid can flow.

In certain embodiments the rollers have one or more extensions, brushes, fingers, flights, blades and/or wings—either flexible or rigid—projecting outwardly which meet, nearly-meet or mesh with each other to prevent gumbo from falling down between rollers, to move gumbo along on top of the rollers, and/or to facilitate the flow of liquid between the rollers.

According to certain aspects of the present invention the roller bed covers substantially all of the surface of the shaker screens. In other embodiments the roller bed covers only a portion of the shaker's basket and gumbo conveyed on the roller bed is allowed to fall down onto a screen.

In certain aspects two roller beds are used above a shaker's basket either with rollers of similar size and spacing or with rollers of different size and/or different spacing. In other aspects the rollers are driven by a motor so that they rotate to facilitate the movement of masses of gumbo.

A removable roller bed according to the present invention may be made, sized and configured for installation on any known shale shaker. With driven rollers, rollers may be manually rotated or a motor apparatus may be used to rotate the rollers, either a separate motor may be provided or power sources already in place may be used with suitable connections, gearing, belts, etc. Appropriate mounts and supports may be used with a roller bed or a series of rollers may be connected directly to the walls of a shaker basket.

It is, therefore, an object of at least certain preferred embodiments of the present invention to provide new, useful, unique, efficient, non-obvious shale shaker systems and methods that efficiently and effectively deal with hydrated clays or "gumbo" in drilling fluids;

Such systems and methods with an upper roller bed for separating gumbo from drilling fluid, conveying gumbo from off a shale shaker, and/or for reducing the fluid loading on a screen or screens of a shale shaker;

Such systems and methods wherein rollers of a roller bed are solid or allow fluid flow therethrough; and Such systems and methods in which rollers have projection members extending therefrom for clearing a space between rollers, for allowing fluid to flow between rollers, and/or for preventing gumbo from flowing into the space between rollers.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIG. 1 is an end view of a shale shaker according to the present invention.

FIG. 2 is a side view of the shale shaker of FIG. 1.

FIG. 11A is a side view of a roller according to the present invention.

FIG. 11B is a perspective view of a roller according to the present invention.

FIG. 12A is a side view of a roller for use in a shale shaker according to the present invention. FIG. 12B is an end view of the roller of FIG. 12A.

FIG. 13 is a top view of part of a coating of the roller of FIG. 12A.

FIG. 14A is an end view of a roller for use in a shale shaker according to the present invention. FIG. 14B is a cross-sectional view of the roller of FIG. 14A.

FIG. 15 is a perspective view of a roller for use in a shale shaker according to the present invention.

FIG. 16A is an end view of a roller for use in a shale shaker according to the present invention. FIG. 16B is a front view of the roller of FIG. 16A.

FIG. 17A is an end view of a roller for use in a shale shaker according to the present invention. FIG. 17B is a front view of the roller of FIG. 17A.

FIGS. 18, 19, and 20 are front views of rollers for use in shale shakers according to the present invention.

FIG. 23 is a side cross-section view of a roller system for a shaker according to the present invention.

DESCRIPTION OF EMBODIMENTS PREFERRED AT THE TIME OF FILING FOR THIS PATENT

The present invention, in certain aspects, provides an improved shale shaker (e.g., but not limited to, as compared to the shaker as disclosed in U.S. Pat. No. 4,116,288, incorporated fully herein for all purposes). In certain embodiments, drilling mud is screened by means of a vibratory screen apparatus such as a shale shaker. The drilling mud flows through the screening apparatus while undesirable particulate matter, e.g. large masses or particles or gumbo, is separated from the drilling mud by a top roller assembly and drilling solids are removed by one or more screens and conducted from the screening apparatus for ultimate disposal. The cleaned drilling mud is then conveyed to suitable storage areas or tanks or to mud tanks for reinjection of the drilling mud into the well bore.

Figure 3:
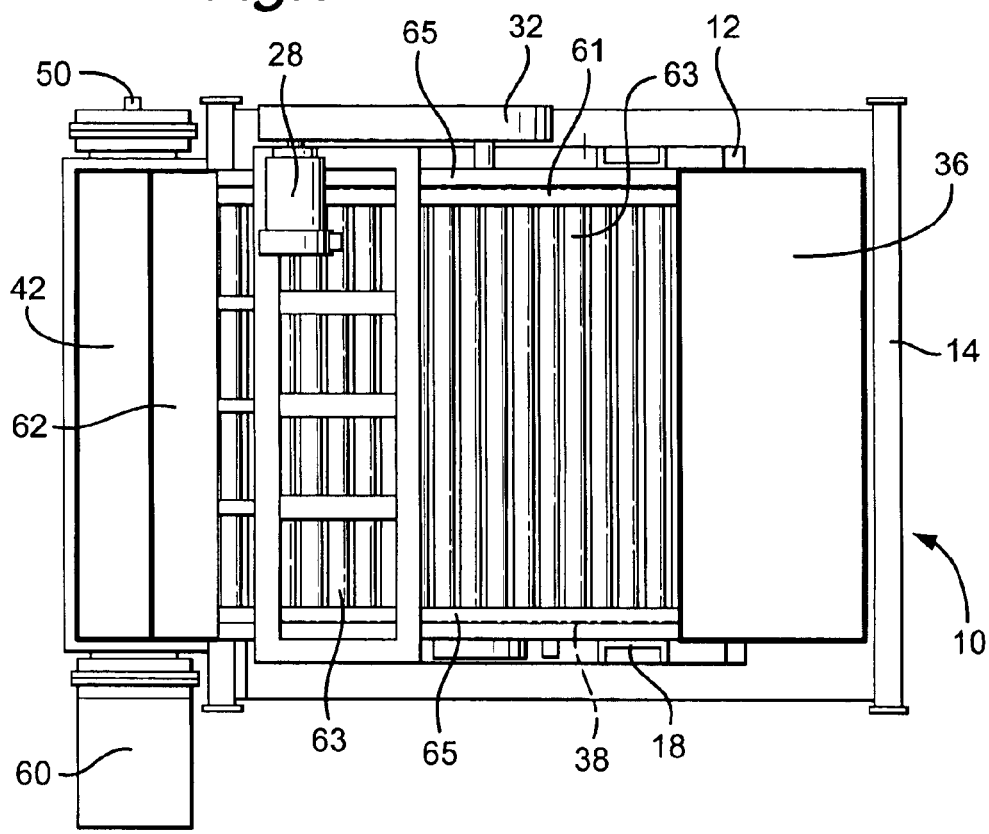
FIG. 3 is a top view of the shale shaker of FIG. 1.

As shown in FIG. 1 a mud processing system 10 according to the present invention has a framework 12 mounted on a skid base 14. A vibratory screen housing 16 has a plurality of support elements such as shown at 18 and 20 that are received by the upper portion of resilient elements 22 and 24, respectively, that are in turn supported by the framework 12. The resilient support elements 22 and 24 may comprise compression spring systems if desired, or in the alternative, may take any other suitable resilient form that allows substantial movement of the vibratory screen housing 16 relative to the framework 12. The framework 12 may incorporate a motor support structure 26 having an electric motor 28 or any other suitable motor element secured thereto. The motor 28 may be suitably connected to an eccentric weight device 30 that it is journaled for rotation by the vibratory screen housing. For example, the motor 28 may be connected to the rotatable eccentric weight 30 by means of a belt and pulley arrangement 34 that allows the eccentric weight to be driven by the motor. The motor, rotatable eccentric weight, and drive belt system may be received within a guard device 32 (FIGS. 1 and 3).

It is to be understood that the system 10 is skid mounted for the purpose of being placed over a conventional oil field mud tank. Drilling fluid with large masses or particles and/or gumbo therein is fed from a feed hopper box 36. The mud etc. overflows the hopper box 36 and falls down onto a roller assembly 61. The roller assembly 61 has a plurality of rollers 63 rotatably mounted to a mounting structure 65 that itself is mounted to the framework 12. In FIG. 2 the mounting structure 65 has been deleted and the ends of the rollers are shown in cross-section on the side of the framework 12.

Masses too large to pass between spaces between the rollers 63 move on top of the rollers and then out of the framework 12 for collection in an apparatus 62 (shown schematically). Clarified mud descends through the screens 38 and 40 and then into a mud receiver such as a mud tank (not shown), whereupon the mud is capable of being recirculated to the wellbore minus the solids, gumbo, masses or particles, etc.

As shown in FIG. 1, there are two screens 38 and 40 mounted below the roller assembly 61. It is within the scope of this invention for the screens 38 and 40 to be of any desired mesh and for either of them to be deleted. It is also in the scope of this invention to use three or more such screens. In one particular aspect both screens 38 and 40 are fine screening screens. Alternatively any known screen or screen assemblies for shale shakers may be used in the system 10. As noted above, both the screens 38 and 40 are mounted for vibration in order to enhance separation and in order to direct the separated materials to a discharge trough or receptacle for ultimate disposition. The trough 42 is for receiving the separated material from the top of the screens 38 and 40. The reception apparatus 62 (shown schematically) receives the gumbo material, large masses, etc. from the top of the roller assembly 61. Material on the roller assembly 61 is vibratorily ejected therefrom and/or is conveyed therefrom in embodiments in which the rollers or at least some of them are driven, e.g., by the motor of the system 10 (with appropriate gears, belts, and/or interconnection members, etc.) or by an additional motor (not shown).

In operation of the device above described, the system 10 is mounted above a mud tank with the skid 14 resting on the mud tank. Drilling mud from the wellbore containing drilling solids, large masses, and/or gumbo material is pumped from the wellbore to the feed hopper box 36. The materials overflow onto the roller assembly 61 and through it liquid and some of the solids flow to the screens 38 and 40. Large masses and/or gumbo, etc. move off the roller assembly into the reception apparatus 62 for storage or for further processing. Drilling solids are retained on top of the screens 38 and 40 and cleaned mud falls into the mud tank free of them. Vibration of screens 38 and 40 causes the materials thereon to be advanced to the end edge of screens 38 and 40 where they fall into the trough 42. A system 60 (shown schematically) moves the drilling solids from the trough 42.

Figure 4:
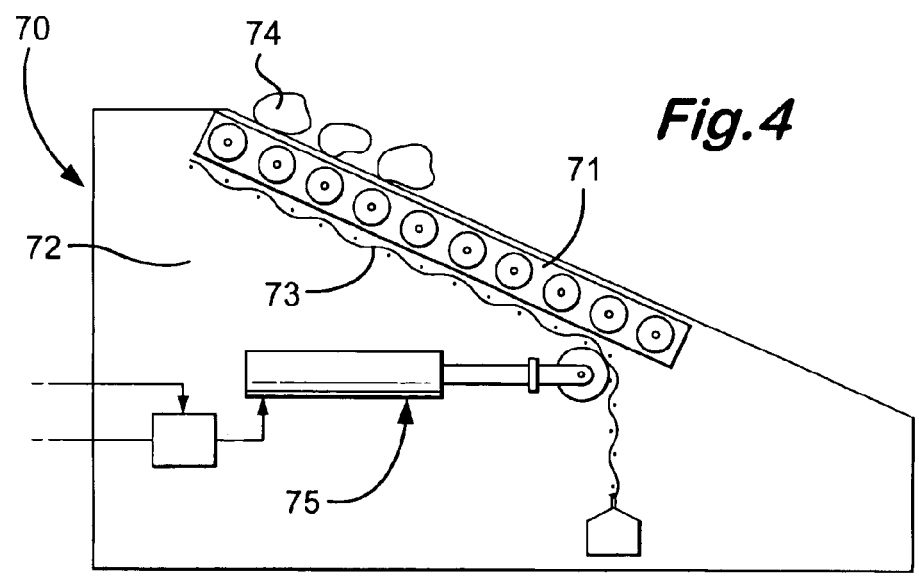
FIG. 4 is a side view of a shale shaker according to the present invention.

FIG. 4 shows a shale shaker 70 which is like the shale shaker disclosed in FIG. 3 of U.S. Pat. No. 4,809,791, incorporated fully herein for all purposes, but which has an upper roller assembly 71 according to the present invention mounted to a shaker basket 72 above a foraminous bed or screen 73. Masses of gumbo 74 in drilling fluid introduced to the shale shaker 70 move on top of rotatable rollers 75 of the roller assembly 71. Optionally, apparatus 75 provides for adjustment of tension in the screen 73 (which can be any known screen or screens used for treating drilling fluid).

Figure 5A:
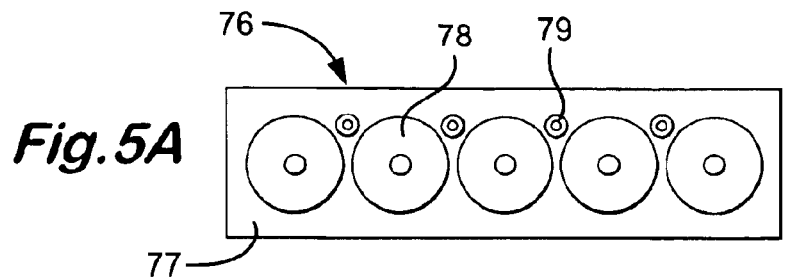
FIGS. 5A–5C are cross-section views of roller assemblies according to the present invention.

FIG. 5A shows a roller assembly 76 according to the present invention which has a mounting structure 77 to which are rotatably mounted relatively larger rollers 78 and relatively smaller rollers 79. The relatively smaller rollers occupy space between the larger rollers to prevent gumbo masses from falling between the larger rollers. Any series of rollers described herein may have a series of interspersed smaller rollers as shown in FIG. 5A. As is the case for any roller disclosed herein, the rollers 78 and 79 may be rotatably mounted to the mounting structure 77 using any suitable known roller mounting mechanism, structure, or apparatus. As is the case with any mounting structure disclosed herein, the mounting structure 77 may be sized and configured to fit into the top of or onto the top of any known shale shaker.

Figure 5B:
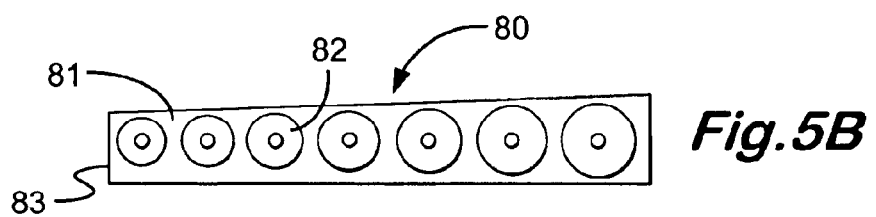

FIG. 5B shows a roller assembly 80 according to the present invention which has a mounting structure 81 to which are rotatably mounted a plurality of rollers 82 which differ in outer diameter. An end 83 of the mounting structure 81 may, in one aspect, be positioned at feed end or "possum belly" end of a shale shaker to initially receive drilling fluid with large masses and/or gumbo therein. As is the case with any roller assembly according to the present invention, the mounting structure 81 may be mounted within or on a shale shaker basket so that a line along the top surfaces of the rollers 82 is horizontal, is inclined downwardly from a fluid introduction end of a shaker, or is inclined upwardly from a fluid introduction end of a shaker.

Figure 5C:
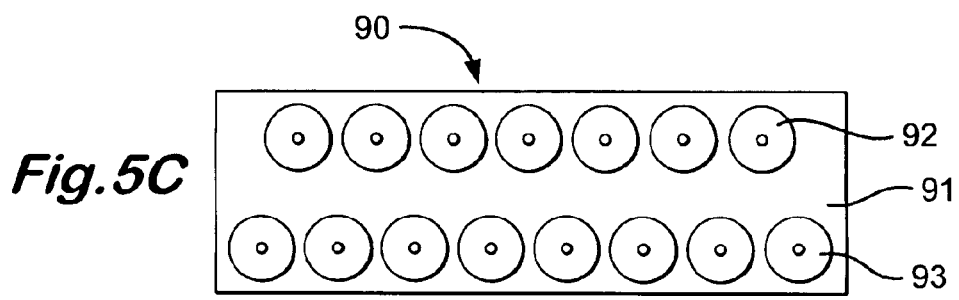

FIG. 5C shows a roller assembly 90 according to the present invention for use in a shale shaker for treating drilling fluid with large masses or gumbo therein. An upper plurality of spaced-apart rollers 92 and a lower plurality of spaced-apart rollers 93 are rotatably mounted to a mounting structure 91. In one aspect, as viewed from above or from the side, the rollers 92 are offset from the rollers 93. Spacing between rollers 92 and 93 may be similar or different. Although two levels of rollers are shown, it is within the scope of this invention for the roller assembly 90 (and for any roller assembly disclosed herein and for any shale shaker according to the present invention) to have two, three or more levels of rollers.

Although only side or cross-sectional views are shown for the roller assemblies in FIGS. 4–5C, it is to be understood that they are generally like the roller assembly of FIGS. 1–3 with a plurality of rollers extending from one side of a mounting structure to the other and with spacing between rollers for fluid flow between rollers.

Figure 6:
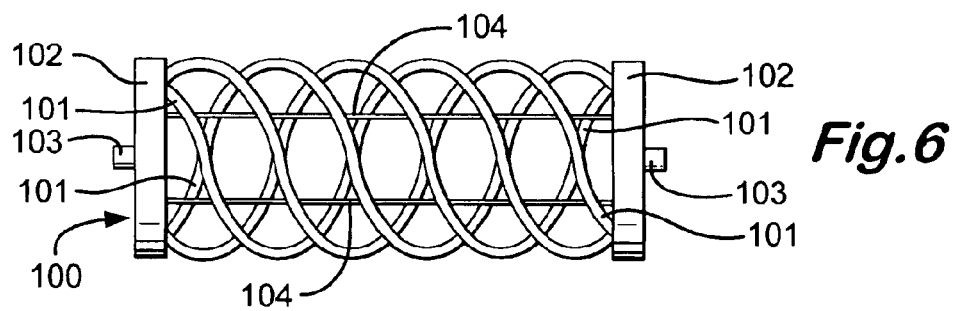
FIG. 6 is a top view of rollers according to the present invention.

FIG. 6 shows a roller 100 according to the present invention for use in any roller assembly disclosed herein (and any, some, or all rollers may be like the roller 100; as is true for any particular roller disclosed herein). Wires 101 spiral between and are connected to roller end pieces 102 each with a central shaft 103 projecting therefrom for mounting to any mounting structure disclosed herein. One, two, three, four or more (two shown) support rods 104 extend from one end piece 102 to the other and the wires 101 are connected to the support rods 104, e.g. by epoxy, welding, or sintering. As is the case with any roller, roller part, wire or support rod mounting structure disclosed herein, the wires 101, end pieces 102, and/or support rods 104 may be made from any suitable material, including, but not limited to, plastic, metal, composite, aluminum, aluminum alloy, zinc, zinc alloy, bronze, brass, steel, stainless steel, polytetrafluoroethylene, aramid fibers, KEVLAR™ material, and fiberglass.

Figure 7:
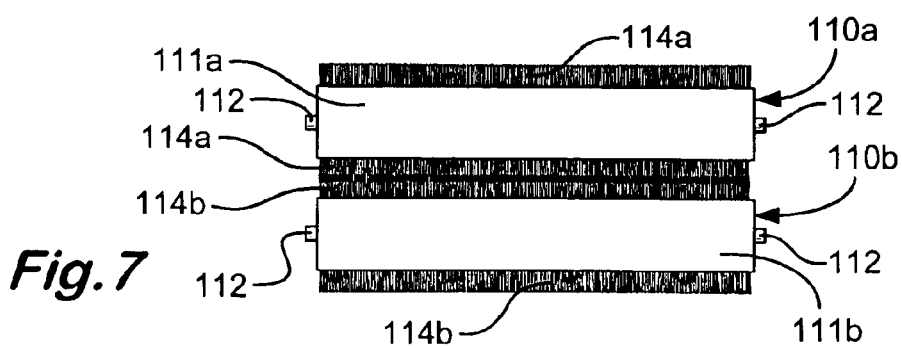
FIG. 7 is a top view of rollers according to the present invention.

FIG. 7 shows rollers 110a and 110b according to the present invention each with a roller body 111a, 111b respectively and end mounting shafts 112a. Projecting from each roller body 111 are bristles or brush material 114a, 114b respectively. In one aspect the rollers 110a, 110b are mounted to mounting structure so that, as shown in FIG. 7, the bristles 114a, 114b mesh with each other as the rollers rotate preventing gumbo (or other material) from passing between the rollers. The bristles 114a, 114b also clean the space between rollers and may be positioned so brushes on one roller clean the body of an adjacent roller. The rollers 110a, 110b (as is the case for any roller disclosed herein) may have any desired number of lines of bristle or brush material (two shown for each roller in FIG. 7), e.g. but not limited to two, three, four, five, six, seven, eight or more, and in one particular aspect eight lines of such material spaced-apart as are the lines of fingers shown in FIGS. 14A and 14B as described below. Also it is within the scope of this invention for the lines of bristles or brush material to be straight from one roller end to the other (as shown in FIG. 7) or to be of any desired shape or configuration, e.g., but not limited to, shapes and configurations as shown for wires in FIGS. 10A–11B. It is also within the scope of this invention for the bristles or brush material to project outwardly from the roller body any desired amount. The bristle or brush material may be any suitable known metal, plastic, fiberglass, or composite material, including, but not limited to, those mentioned herein. In one particular aspect bristle or brush material is positioned on one roller so that it never contacts similar material on an adjacent roller as the rollers rotate.

Figure 8A:
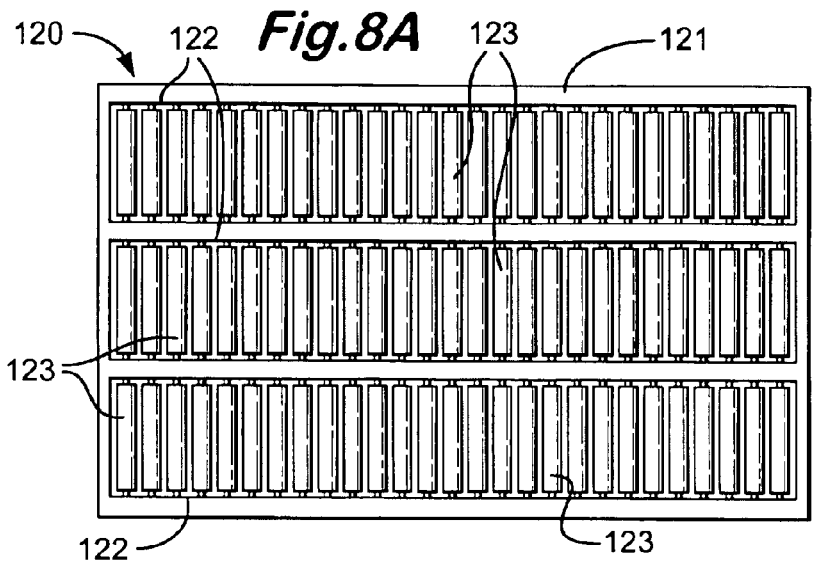
FIGS. 8A and 8B are top views of roller assemblies according to the present invention.

FIG. 8A shows a roller assembly 120 according to the present invention which has a mounting structure 121 with three openings 122 therethrough. In each opening 122 are rotatably mounted a plurality of rollers 123. Drilling fluid introduced onto the roller assembly 120 will flow down between the rollers 123 and large masses, e.g. masses of gumbo, will move along the rollers and off the roller assembly 120. It is within the scope of this invention to size and configure the mounting structure 121 (and the mounting structure 131, below) to fit in or on any known shale shaker and it is also within the scope of the present invention to use a mounting structure with two, four, five, six or more openings 122. Also, the openings 122 may extend from one end (or side) of the mounting structure to the other; and/or a plurality of spaced-apart mounting structures both lengthwise and widthwise may be used.

Figure 8B:
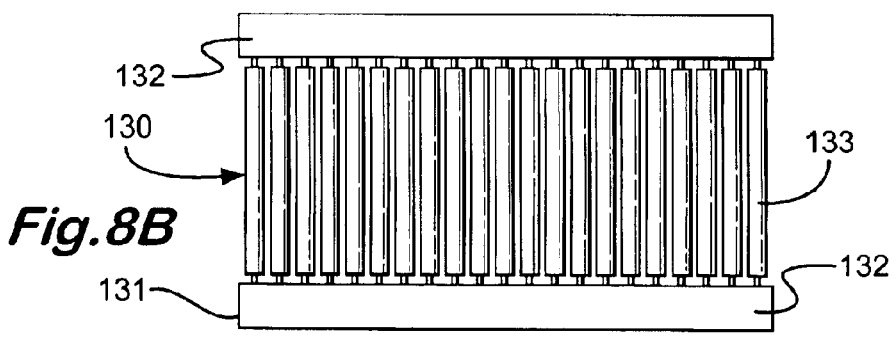

FIG. 8B shows a roller assembly 130 according to the present invention like the roller assembly 120 but with rollers 133 rotatably mounted to the mounting structure 131 which are relatively thinner and relatively longer than the rollers 123 in the roller assembly 120. Also, the mounting structure 131 with side members 132 has no end members (like the members on either side of the roller assembly 120 as viewed in the view of FIG. 8A).

Figure 9A:
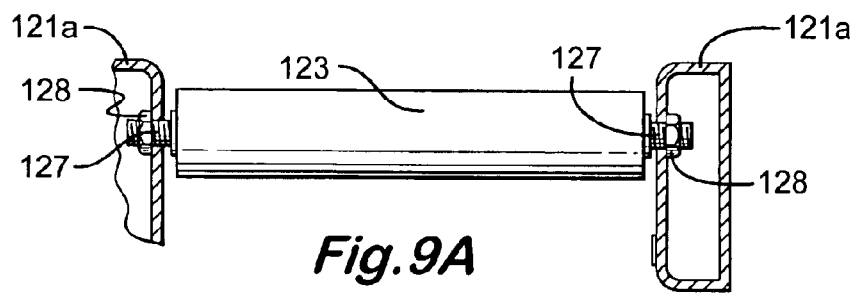
FIGS. 9A and 9B are cross-sectional end views showing rollers and roller mountings for roller assemblies according to the present invention.
Figure 9B:
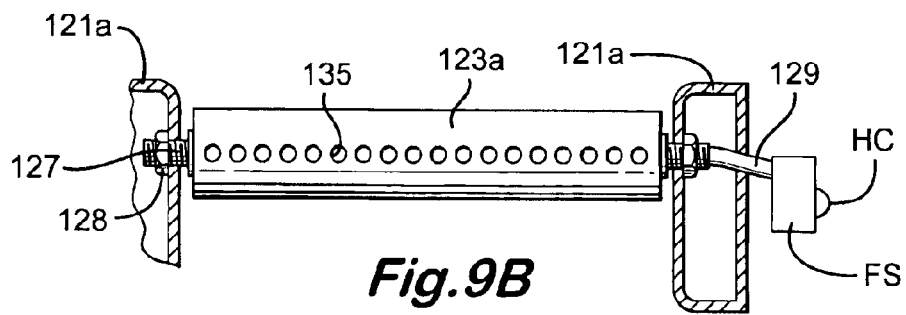
Figure 10A:
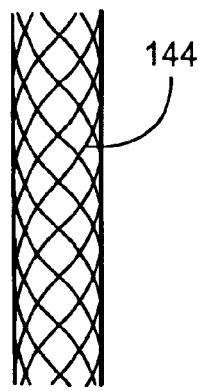
FIGS. 10A–10H are front views of roller parts and rollers according to the present invention.
Figure 10B:
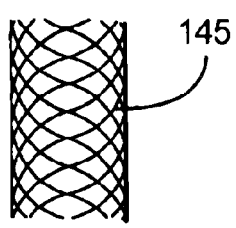
Figure 10C:
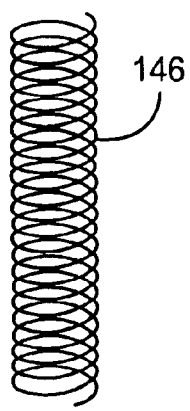
Figure 10D:
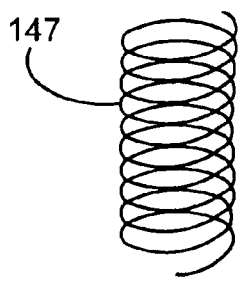
Figure 10E:
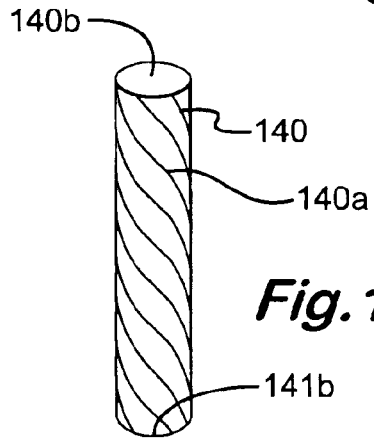
Figure 10F:
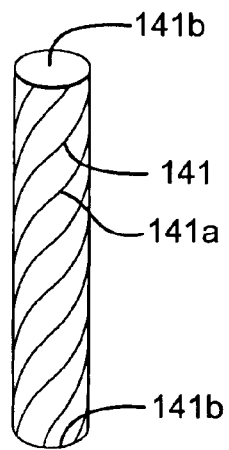
Figure 10G:
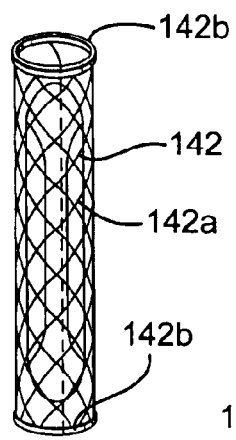
Figure 10H:
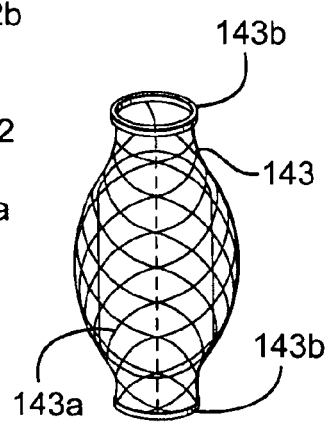

FIG. 9A shows the mounting of a roller 123 (or of a roller 133 or of any roller herein) to parts of a mounting structure 121 (or 131). Shafts 127 of the roller 123 extend through parts 121a of the mounting structure 121 and nuts 128 secure the shafts 127 in place. FIG. 9B shows a similar mounting of a roller 123a (and like numerals indicate like parts) which is like the roller 123, but which is hollow and has a plurality of fluid exit holes 128. Fluid from a fluid source FS is pumped through a line 129 to the interior of the roller 123a and then out the holes 128. This fluid may, in certain particular aspects, be water, drilling mud, or a mixture thereof and it can facilitate the movement of gumbo or large masses on the rollers, and/or cleans the rollers. Any roller disclosed herein may be hollow and have fluid exit holes as in the roller 123a and fluid may be pumped through any such roller. The holes 128 are shown with different diameters, but it is within the scope of this invention to use holes with substantially the same diameter. Optionally, a heater/cooler apparatus HC provides fluid that is heated and/or cooled to the roller 123a. Optionally the holes 128 are deleted and fluid is circulated through the roller 123a (at ambient temperature, heated or cooled).

FIGS. 10A–10D show wire patterns 144–147 for rollers according to the present invention. FIGS. 10E–10H show rollers 140–143 according to the present invention with wires 140a–143a respectively between end pieces 140b–143b respectively. Any roller according to the present invention with wire between end pieces (including, but not limited to, those of FIGS. 6, 11A and 11B) may have any of the wire patterns in FIGS. 10A–10H, with or without support members or rods (e.g. rods 104, FIG. 6).

FIG. 11A shows a roller 150 according to the present invention (e.g. as in FIGS. 1, 4, 5A–5C, 8A or 8B) which has wires 153 and 154 between end pieces 152. Mounting shafts 157 (optional, as are all mounting shafts disclosed herein, and which may be used with any roller herein) project from each end of the roller 150.

FIG. 11B shows a roller 160 according to the present invention with wires 163 between end pieces 162 from which end mounting shafts 167 project. The wires 163 define open areas 164 between wires.

FIGS. 12A and 12B show a roller 170 which may be used for any roller disclosed herein. The roller 170 has a body 171 (hollow or solid) with optional end mounting shafts 177 projecting from each end. The body 171 may be coated with plastics, acrylic, polyurethane, and/or polytetrafluoroethylene material or tape and, in one particular aspect as shown in FIG. 12B the roller is coated with textured material or tape TP which has a three-dimensional pattern PN thereon. Alternatively, a roller may be coated with a plastic tape, painted-on coating, and/or painted on polytetrafluoroethylene.

FIGS. 14A and 14B show a roller 180 which may be used for any roller disclosed herein. The roller 180 has a body 181 from which project a plurality of fingers 182. Adjacent rollers like the roller 180 may be positioned so that their fingers mesh (e.g. as the bristle material meshes in the rollers of FIG. 7). The fingers 182 may be made of any material mentioned herein. As shown in FIG. 14A the roller 180 as depicted has eight lines of fingers 182, but it is within the scope of this invention to provide any desired number of lines of fingers (1–10 or more) and for them to be in any line, shape, or configuration from one end of the roller to the other (e.g. but not limited to as for the bristle or brush material lines 114a, 114b, FIG. 7).

FIG. 15 shows a roller 190 with a hollow body 191 through which extend a plurality of fluid flow holes 192. Mounting shafts 193 (one shown) are at each end 194 of the roller 190. It is within the scope of this invention to provide any roller herein with a body with or without a hollow portion or portions and one or more fluid flow holes through the roller body.

FIGS. 16A–21B show rollers which may be used for any roller of any shaker or roller assembly herein.

FIG. 16A shows a roller 200 with a solid roller body 201 having a textured outer surface 202 for facilitating the movement of material by the roller 200. Optional end mounting shafts 203 project from roller ends 204.

FIG. 17A shows a roller 200a, like the roller 200, FIG. 16A (like numerals indicate like parts), but with a hollow roller body 201a.

FIG. 18 shows a roller 210 with end pieces 212 between which is a roller body 211. Wires 213 are connected between the end pieces 212 and, optionally, are bonded, glued, or adhered to the outer surface of the body 211.

Figure 19:
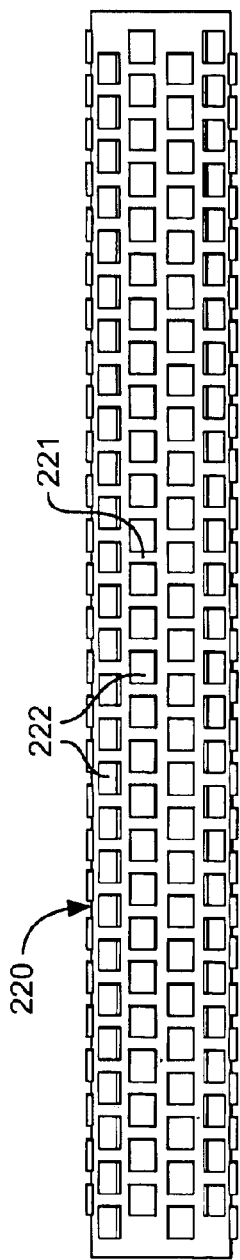

FIG. 19 shows a roller 220 with a roller body 221 having a plurality of projections 222 projecting outwardly therefrom. It is within the scope of this invention for any roller body herein to have one or more such projections of a similar or different shape.

Figure 20:
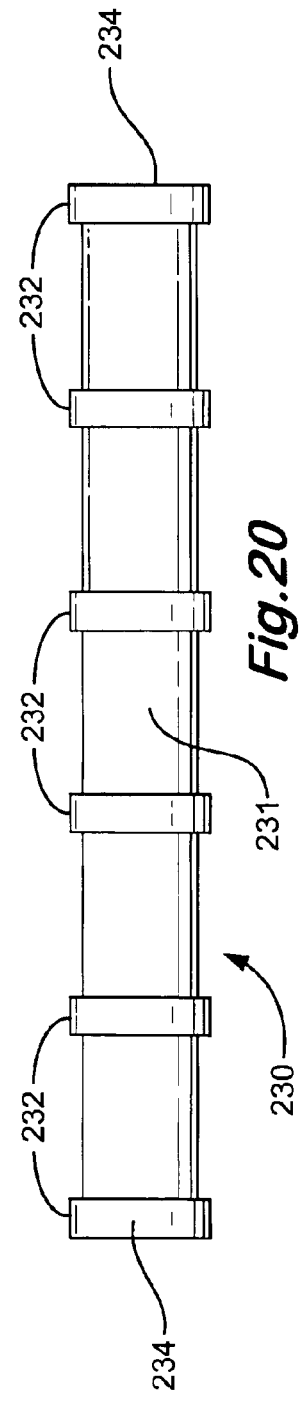

FIG. 20 shows a roller 230 with a roller body 231 and bands 232 which completely encircle the circular roller body 231. It is within the scope of this invention to use any number of bands 232; to use bands only at roller ends 234; and/or for the bands to project outwardly any desired length from the roller body 231.

Figure 21B:
FIG. 21A is a front view and FIG. 21B an end view of a roller for use in a shale shaker according to the present invention.
Figure 21A:
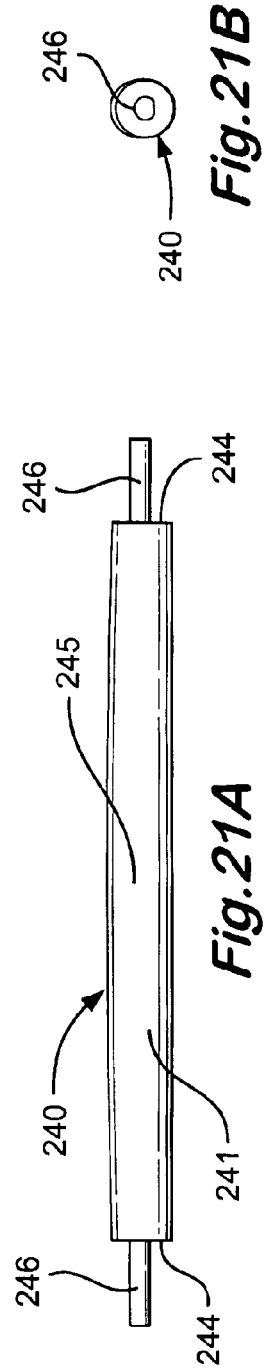

FIGS. 21A and 21B show a roller 240 which is a "banana" roller with a non-uniform cross-section and a diameter of a roller body 241 which increases from roller ends 244 to a roller middle 245. Optional mounting shafts 246 project from the ends 244.

Figure 22A:
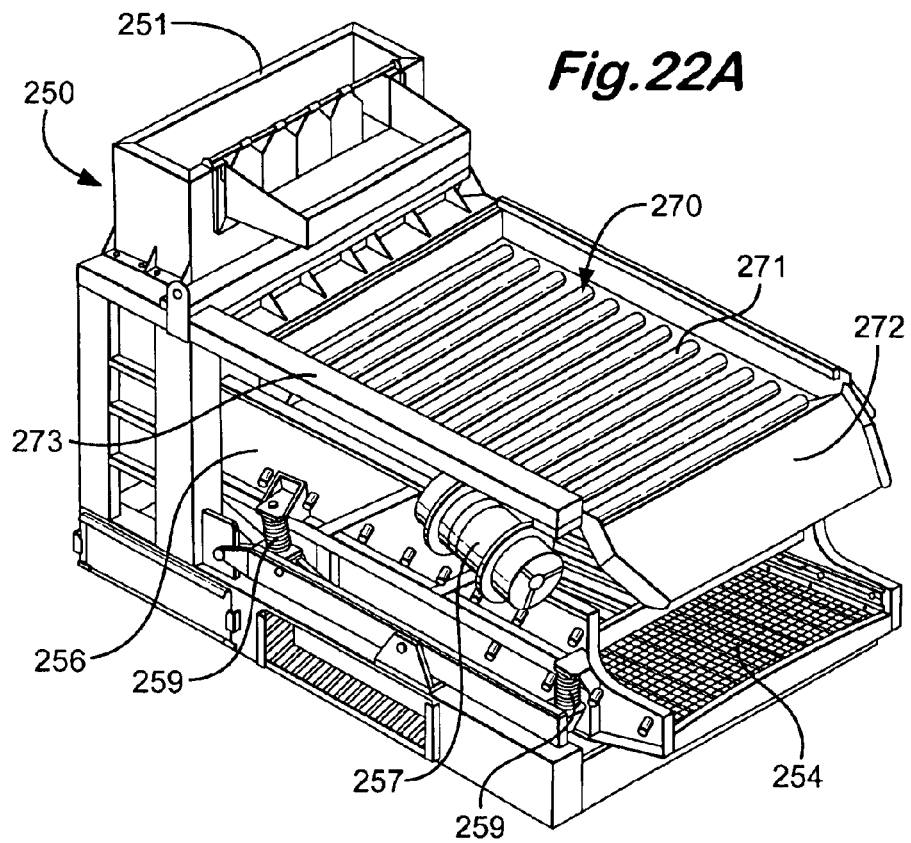
FIG. 22A is a perspective view of a shaker according to the present invention.
Figure 22B:
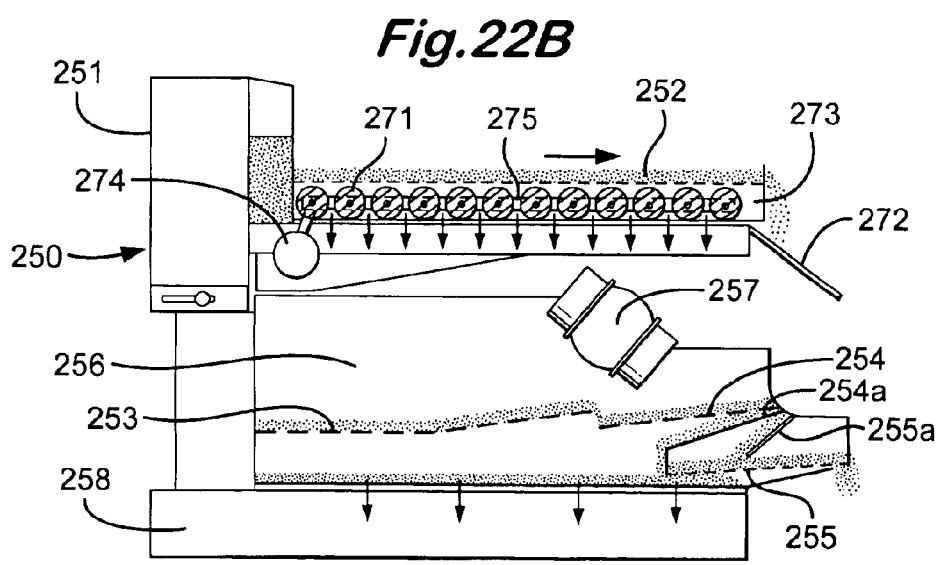
FIG. 22B is a side view of a cross-section of the shaker of FIG. 22A.

FIGS. 22A and 22B show a shaker 250 according to the present invention with a roller assembly 270 (see also FIG. 23) according to the present invention. It is within the scope of this invention to provide a roller assembly 270 on any shaker disclosed or referred to herein. Material to be treated by the shaker 250 is introduced onto the roller assembly 270 from a container 251. Relatively larger masses 252 (e.g. masses of gumbo) move on top of rollers 271 onto an exit ledge 272. Material and fluid (other than the masses 252) flows between the rollers 271 down to screening apparatuses 253, 254 and 255 which are mounted in a shaker basket 256. Vibratory apparatus 257 vibrates the basket 256 and the screen apparatus 253–255. A flowback pan 254 under the screening apparatus 254 receives fluid flowing through the screening apparatus 254 and a flowback pan 255a directs material to the screening apparatus 255.

Material and/or fluid flowing through the screening apparatuses 253–255 flows down into a sump, tank or container (not shown). The basket 256 is mounted on a frame 258 with springs 259 (two shown in FIG. 22A; two others, not shown, on the opposite side to those shown in FIG. 22A).

The rollers 271 are rotatably mounted in a frame 273 and are rotated by a motor apparatus 274 (as may be any roller or roller in any embodiment disclosed herein). A chain or belt 275 extends around axles 276 of each roller and a belt or chain 277, extends around an axle 276 of one of the rollers 271. The motor apparatus 274 moves the belt or chain 277, moving the first roller 271, and thereby rotating all the rollers. Alternatively, a motor used with the vibratory apparatus 257 can provide the power to rotate the rollers 271 (as may be the case for any shale shaker with a roller assembly according to the present invention).

Although roler bed assemblies are illustrated herein secured to a basket of a shale shaker, it is within the scope of this invention to secure a roller assembly according to the present invention to a frame or other sturcture—other than a basket—for positioning the roller assembly above screening apparatus of a shale shaker. It is then within the scope of this invention for a basket or other screen mounting structure to be secured to such a frame or other structure or to be independent of it.

The present invention, therefore, provides in at least some, but not necessarily all, embodiments a shale shaker with a basket for holding screen assembly apparatus, screen assembly apparatus for treating fluid introduced to the shale shaker, a roller bed assembly secured to the basket or other structure above the screen assembly apparatus, the roller bed assembly having a plurality of spaced-apart rotatable rollers, the fluid initially introduced to the shale shaker onto the roller bed assembly.

The present invention, therefore, provides, in at least certain embodiments, a shale shaker with a basket for holding screen assembly apparatus, screen assembly apparatus for treating fluid introduced to the shale shaker, a roller bed assembly secured to the basket above the screen assembly apparatus, the roller bed assembly having a plurality of spaced-apart rotatable rollers, the fluid initially introduced to the shale shaker onto the roller bed assembly, wherein the fluid is drilling fluid with gumbo therein, said gumbo separable from the drilling fluid by the roller bed assembly, and motor apparatus interconnected with the plurality of spaced-apart rotatable rollers for rotating said rollers.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventor may rely on the Doctrine of Equivalents to determine and assess the scope of their invention and of the claims that follow as they may pertain to apparatus not materially departing from, but outside of, the literal scope of the invention as set forth in the following claims. Any patent or patent application referred to herein is incorporated fully herein for all purposes.

What is claimed is:

1. A shale shaker comprising
a basket for holding screen assembly apparatus,
screen assembly apparatus for treating fluid introduced to the shale shaker,
a roller bed assembly secured above the screen assembly apparatus, the roller bed assembly having a plurality of spaced-apart rotatable rollers, the fluid initially introduced to the shale shaker onto the roller bed assembly,
wherein at least one roller of the plurality of spaced-apart rotatable rollers has a central cavity therein, a plurality of holes extending from the central cavity to an outer surface of the at least one roller, and
fluid movement apparatus in fluid communication with the central cavity for pumping fluid into the central cavity and out from the roller through the plurality of holes.

2. The shale shaker of claim 1 wherein the screen assembly apparatus comprises a plurality of screen assemblies mounted in the shaker basket.

3. The shale shaker of claim 2 wherein the plurality of screen assemblies include a first screen assembly and a second screen assembly, the first screen assembly mounted above the second screen assembly.

4. The shale shaker of claim 1 wherein the fluid is drilling fluid with large undesirable solids therein, said large undesirable solids separable from the drilling fluid by the roller bed assembly.

5. The shale shaker of claim 1 wherein the fluid is drilling fluid with gumbo therein, said gumbo separable from the drilling fluid by the roller bed assembly.

6. The shale shaker of claim 1 further comprising
motor apparatus interconnected with the plurality of spaced-apart rotatable rollers for rotating said rollers.

7. The shale shaker of claim 1 wherein the rollers of the plurality of spaced-apart rotatable rollers each have a similar outer diameter.

8. The shale shaker of claim 1 wherein each roller of the plurality of spaced-apart rotatable rollers is at substantially the same height in the basket.

9. The shale shaker of claim 1 wherein the roller bed assembly is inclined with respect to the basket.

10. The shale shaker of claim 1 wherein the roller bed assembly has a first end and a second end and the basket has a material introduction end and a material exit end, the material introduction end higher than the material exit end, the roller assembly's first end at the material introduction end of the basket.

11. The shale shaker of claim 1 wherein at least one roller of the plurality of spaced-apart rotatable rollers comprises two spaced-apart ends and a plurality of wires extending between and secured to the two spaced-apart ends.

12. The shale shaker of claim 1 wherein at least one roller of the plurality of spaced-apart rotatable rollers is hollow.

13. The shale shaker of claim 1 wherein at least one roller of the plurality of spaced-apart rotatable rollers has holes therethrough.

14. The shale shaker of claim 1 wherein at least one roller of the plurality of spaced-apart rotatable rollers has two spaced-apart ends and a body between the two spaced-apart ends, the body having a middle and two spaced-apart body ends, the body thicker in the middle then at the body ends.

15. The shale shaker of claim 1 wherein at least one roller of the plurality of spaced-apart rotatable rollers has a body and a plurality of projections extending out from the body.

16. The shale shaker of claim 1 wherein the screen assembly apparatus has a surface area and the roller bed has a surface area, the surface area of the screen assembly apparatus greater than the surface area of the roller bed.

17. The shale shaker of claim 1 wherein the screen assembly apparatus has a surface area and the roller bed has a surface area, the surface area of the screen assembly apparatus is substantially equal to the surface area of the roller bed assembly.

18. The shale shaker of claim 1 wherein at least one roller of the plurality of spaced-apart rotatable rollers has bristles thereon and projecting therefrom.

19. The shale shaker of claim 1 wherein the rollers of the plurality of spaced-apart rotatable rollers are solid.

20. The shale shaker of claim 1 wherein the rollers of the plurality of spaced-apart rotatable rollers are about two inches in outer diameter and about one-half inch apart.

21. The shale shaker of claim 1 wherein the roller bed assembly is secured to the basket.

22. A shale shaker comprising a basket for holding screen assembly apparatus, screen assembly apparatus for treating fluid introduced to the shale shaker, a roller bed assembly secured to the basket above the screen assembly apparatus, the roller bed assembly having a plurality of spaced-apart rotatable rollers, the fluid initially introduced to the shale shaker onto the roller bed assembly, wherein the fluid is drilling fluid with gumbo therein, said gumbo separable from the drilling fluid by the roller bed assembly, motor apparatus interconnected with the plurality of spaced-apart rotatable rollers for rotating said rollers, wherein at least one roller of the plurality of spaced-apart rotatable rollers has a central cavity therein, a plurality of holes extending from the central cavity to an outer surface of the at least one roller, and fluid movement apparatus in fluid communication with the central cavity for pumping fluid into the central cavity and out from the roller through the plurality of holes.

\* \* \* \* \*